United States Patent Office 3,191,174
Patented June 22, 1965

3,191,174
IONOSPHERIC INVESTIGATION APPARATUS
Lloyd Henry Heisler, 11 Nockolds Ave., Punchbowl, New South Wales, Australia and Leslie Darcy Wilson, 11 Ross St., Epping, New South Wales, Australia
Filed Nov. 1, 1962, Ser. No. 234,690
Claims priority, application Australia, Nov. 6, 1961, 10,995/61
2 Claims. (Cl. 343—17.2)

This invention relates to improved apparatus for examining the condition of the ionosphere for research purposes at large and also in connection with radio transmission, weather forecasting or like purposes.

It is known to send out a series of impulses of gradually increasing rate of frequencies from a ground station, and to deduce the condition of the ionosphere above the station by examination of the reflected radio signals, or from the fact that the signals are not reflected.

Hitherto the apparatus employed for this purpose has been of a complicated and expensive nature, and has involved manually or motor driven mechanical means and associated cam elements to control the sequence of operations.

The object of the present invention is to provide an improved ionospheric investigation apparatus which shall use electronic means only to cover the desired frequency range of radio impulses, no cams, rotating condensers or electric motors being employed.

In accordance with the present invention an improved apparatus for investigating the ionosphere incorporates means for effecting an electronic sweep through the range of frequency impulses, by employing a phase shift oscillator.

Phase shift oscillators have been employed in the past for such purposes as testing television receivers. A particular economy is achieved in the present apparatus in that many standard and readily available parts may be employed in its construction.

Further features of the invention will be apparent from the following description of a preferred construction in accordance therewith which will now be given by way of example.

The basic ionosonde recorder consists of a receiver tuned synchronously to a transmitter which scans over the frequency range $f_0$ to $f_1$ mc./s. in the scan period T seconds, at the scan rate of S scans per hour. The transmitter is pulsed, the pulse length being $t$ microseconds at a repetition frequency of F cycles per second, where F usually is equal to the local A.C. supply frequency. The directly received pulse and echoes are displayed on one axis of a cathode ray oscillograph display calibrated in height, and a calibrated frequency scale is provided either by movement of the height scale across the axis of movement of the recording film or by movement of the film itself.

In older types of recorders synchronisation between transmitter and receiver was maintained by the use of cams and band switching. In the panoramic type recorder this was avoided by covering the frequency range in a single sweep. This is achieved by heterodyning an oscillator continuously variable from $f_0+f_x$ mc./s. to $f_1+f_x$ mc./s. with an $f_x$ mc./s. pulsed oscillator and amplifying the resultant $f_0$ to $f_1$ mc./s. signal to provide the transmitter output.

The same variable oscillator is also used as the local oscillator for a superheterodyne receiver of intermediate frequency $f_x$ mc./s. This receiver has an untuned input stage coupled directly to aerial, and is thus tuned at any instant to the transmitter frequency ensuring automatic tracking.

Weight and size of the equipment have been reduced to a minmum mainly through the use of wide band ferrite cored transformers in the driver and output stages of the transmitter which is capable of delivering 3 kw. pulse peak power input to a 600 ohm balanced antenna over the frequency range. Most of the power supplies are electronically voltage regulated. Total power consumption of the equipment is 675 watts.

The complete recorder weighs approximately 253 pounds and is contained in a 22 inch square cubicle which stands 34 inches high (without camera or camera box). It is quite transportable and can readily be handled by one man. Particular attention has been paid to service accessibility and chassis are arranged to hinge forward from the housing to expose all working components. The use of standard and readily available valves throughout has led to a very economical design.

References made in the foregoing description to mechanically tuned equipment for pulse echo ionospheric investigation are best represented by United States Patent No. 2,557,156 by Sulzer, which uses a mechanical tuning device (an electric motor driving a tuning capacitor at 1 r.p.m. desirably), which is capable of scanning in a fixed pattern as determined by a cam or by shaped tuning capacitor plates.

The device of the present invention uses electronic scan to remove many of the limitations of such prior art equipment. The scanning facility is performed within the equipment by generation of a scanning voltage waveform and its application to a voltage controlled oscillator from which the required frequency scan is derived. Equipment function is therefore determined by this waveform, its shape, amplitude and duration, rather than by rate of rotation of shaped cams, or shaped tuning capacitor rotor plates. Consequently:

(i) Scan range may be adjusted to cover any band of frequencies by change or scanning voltage waveform amplitude, and the starting and finishing potentials of this waveform.

(ii) Time of scan may be adjusted by change of scanning voltage waveform duration.

(iii) The law of variation of frequency with time can be altered by changing the waveform of the scanning voltage.

In particular a prefectly linear variation of frequency with time may be recorded by using the same waveform to provide a frequency scale axis by deflection of the final display on the recording oscillograph.

All the facilities listed in (i) to (iii) above may be varied readily by simple panel controls.

In addition, the transmitter section of the equipment has been considerably improved.

(i) A wide band class B output stage has been developed using specially designed transformers in driver and output stages. This enables total number of amplifying stages to be reduced and avoids the necessity of using large and expensive transmitting tubes such as have often been used in previous equipment.

(ii) An entirely new mixing circuit is used which provides mixing a variable frequency oscillator and fixed frequency oscillator signals so that sum and difference frequencies appear in the output only. As the sum frequencies are considerably attenuated in those states following the mixer, this ensures that only the wanted difference frequency occurs at the transmitter output.

Receiver circuits have also been improved.

(i) Radio frequency amplification has been added to the receiver with advantages in gain and increased signal noise ratio. This has been facilitated by development of a wide band input transformer which enables the unbalanced input circuit of the amplifier stage to be coupled to the balanced aerial input arrangement of the delta type aerial usually employed.

(ii) A new type of mixing circuit is used in the receiver such that sum and difference frequencies occur in the output only, and there is therefore no fear of overload in subsequent I.F. stages from local oscillator frequencies very close to the intermediate frequency. As a consequence the receiver is responsive to frequencies as low as 100 kc./s., equipment function can therefore be extended to very low frequencies.

The use of electronic scan and the improvement in the transmitter section in particular, result in equipment which is considerably more compact and more economical to construct than known equipment for similar purposes.

The invention is now more fully described with reference to one practical embodiment of the invention illustrated by drawings:

The basic apparatus comprises a receiver tuned synchronously to a transmitter which scans over the desired frequency range in a desired period of time. The transmitter is pulsed, at a repetition rate corresponding to the local A.C. mains supply frequency. The signals are radiated by an antenna system which directs their energy towards the ionosphere and the directly received pulse from the transmitter and echoes from the ionosphere are displayed on one axis of a cathode ray oscillograph display calibrated in height. A calibrated frequency scale is provided by movement of the height scale across the cathode ray tube face in a direction at right angles to this axis, the final presentation being photographed during the interval occupied by this movement. Alternatively the whole display may be presented on the face of the cathode ray tube having a long persistence screen, whence the complete presentation may be viewed without photographic aid.

Figure 9:
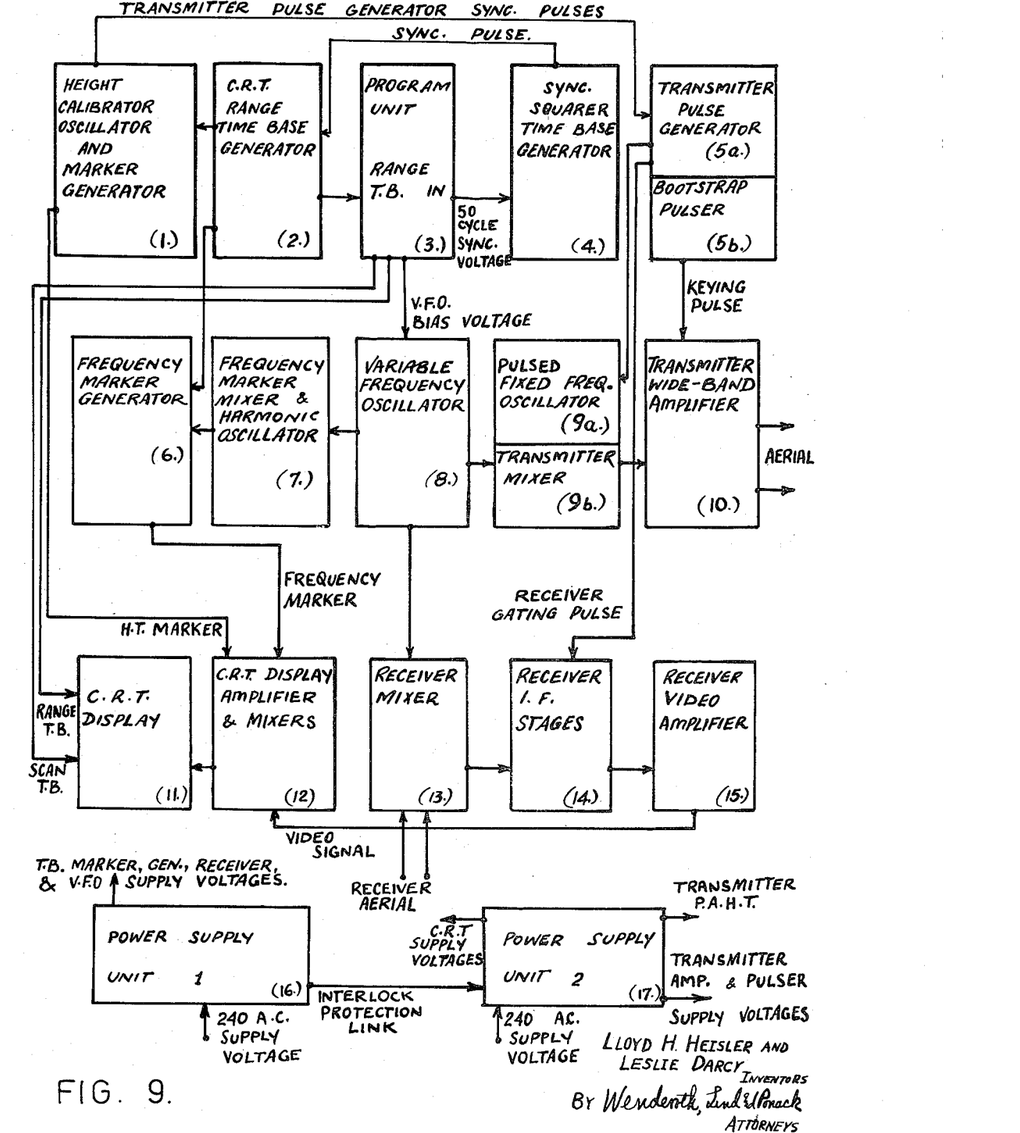
FIGURE 9 is a block diagram of the basic recorder.

Referring now to the block diagram in FIGURE 9. The heart of the equipment is the voltage controlled variable oscillator 8 which is tuned over the range 28.25 megacycles to forty-eight megacycles by application of a voltage waveform of desired shape, amplitude and duration from the program unit 3. The output of the variable frequency oscillator is heterodyned in the transmitter mixer 9b with the output of a twenty-eight megacycle pulsed oscillator 9a. The output which varies from two hundred and fifty kilocycles to twenty megacycles is amplified in a wide band amplifier 10 and radiated as power from the transmitter antenna. The variable frequency oscillator is also employed as the local oscillator of the receiver mixer 13 the input of which is connected by a wide band radio frequency amplifier stage to the receiver aerial. Since the receiver intermediate frequency amplifier 14 is tuned to twenty-eight megacycles, the receiver at any instant is responsive to the radiated frequency of the transmitter and hence exact synchronism between transmitter and receiver is maintained. The detected output from the intermediate frequency amplifier is amplified in the receiver video amplifier 15 and after mixing with frequency and height calibration markers in the amplifier mixer section 12 is applied so as to reduce the intensity of the cathode ray tube beam and remove corresponding portions of the cathode ray tube trace constituting the height range display 11.

Output from the variable frequency oscillator 8 is also applied to the frequency marker mixer and harmonic oscillator 7. Here by a heterodyning process, an audio frequency beat note is produced each time the variable frequency oscillator passes through a one megacycle harmonic. In the frequency marker generator 6 this is converted into a train of ten kilocycle square waves occupying an interval corresponding to two or three times that of the height range interval and gated by a distorted square waveform from the range time base generator 2 so that portions of the wavetrain appear at the beginning and end of the range interval only. These small bursts of ten kilocycles square waves are then mixed with the receiver output signal in the mixer section 12 and applied so as to intensity modulate the cathode ray tube display 11. A pulse derived from the transmitter pulse generator 5a is used to render inoperative the receiver intermediate frequency stage 14 at the commencement of the range interval, so that receiver signals during this interval do not interfere with the frequency marker indication. These markers appear as short intense brightened areas occupying several range intervals at the beginning and end of the range display only, so as not to obliterate important echo detail.

Most waveforms for function of the equipment are derived from the cathode ray tube range time base generator 2. A fifty cycle mains derived sine wave signal controlled by the program unit 3 is used to generate a square wave in the squaring circuit 4. This is differentiated to provide a synchronising pulse which initiates the range time base generator 2. The range time base is amplified in the program unit 3 and applied to the cathode ray tube display 11 so as to provide deflection of the cathode ray tube beam from the bottom to the top of the screen. The range time base generator also provides a square waveform occupying the same time interval as the range time base. This is distorted and applied to the frequency marker generator to provide a function previously discussed. It is also used to gate the height calibration oscillator and marker generator 1 to provide a series of sharp pulse waveforms occupying each range time base interval. These are mixed with receiver and frequency calibration information in the mixing circuit 12 and applied to the cathode ray tube display 11 so as to provide height calibration in the form of small gaps at correct intervals in the range display.

Output from the height calibrator oscillator and marker generator 1 is also applied to the transmitter pulse generator 5a. Here the first sharp pulse waveform from the applied train of pulses is selected and used to generate a pulse of either fifty or one hundred microseconds duration. This is used to operate the pulsed fixed frequency oscillator 9a for the duration of the pulse, ensuring that interfering radiation from the oscillator does not enter tuned circuits of the receiver I.F. amplifiers 14 during the interval when returned echoes are received.

In the bootstrap pulser section 5b the pulse from 5a is developed into a high voltage pulse of the same duration to operate amplifiers in the transmitter wide band amplifier 10. Pulse operation of these stages permits improved performance as higher voltages than normal can be applied to tube elements. Initiation of these pulse waveforms by the first sharp pulse waveform of the marker generator train ensures that the leading edge of the transmitted pulse of radio energy is always coincident with the first height calibration mark on the cathode ray tube display.

The program unit 3 provides the variable frequency oscillator control waveform of controlled duration and shape and repetition frequency such that the oscillator 8 varies frequency over the desired range linearly or logarithmically with respect to time, the scan occupying the desired time, and being repeated at the desired repetition rate. The linear waveform is generated in a conventional resistance capacity charging circuit using feedback to effect linearization, while the logarithmic waveform is derived from the exponential discharge of a charged capacitor through a resistance. The linear waveform is applied to the cathode ray tube display 11 so as to provide deflection of the cathode ray tube beam from the left to right hand side of the screen.

The final presentation is either produced on the face of a cathode ray tube having a long persistence screen whence the height and frequency information can be directly viewed or it may be photographed for an interval corresponding to the scan period to produce an ionogram.

Supply voltages for the equipment are provided by power supply unit 1, 16 and power supply unit 2, 17. These are electronically regulated and fully protected.

(I) VARIABLE FREQUENCY OSCILLATOR

This is the heart of the equipment and is entirely different from the type of oscillator usually employed, in that it is voltage controllable and frequency output is proportional to applied voltage. This permits the following features:

(a) Almost any scan law, i.e., form of frequency variation with time, may be obtained. Logarithmic, linear, square, or even stepped scan laws may be obtained at will by modification of the shape of the applied voltage waveform to the variable oscillator. In previous equipments different laws could only be obtained by changing cam profiles and the facility was not generally variable. In the equipment under discussion a logarithmic or linear law may be selected by a switch.

(b) Scan periods are variable over a wide range and may be as short as two seconds and operated almost continuously. In previous equipments mechanical considerations made such facilities impracticable.

(c) Any portion of the nominal frequency scan 0.1 mc./s. to 20 mc./s. may be selected by the setting of two potentiometers. In previous equipment this facility was impracticable.

(d) The rapid scan facility of the oscillator makes it possible to produce an almost instantaneous picture of the ionosphere, particularly if the recorder is equipped with a long persistence cathode ray tube and push button operation to initiate a fast scan. Such a version of the recorder could be termed an ionoscope.

Figure 5:
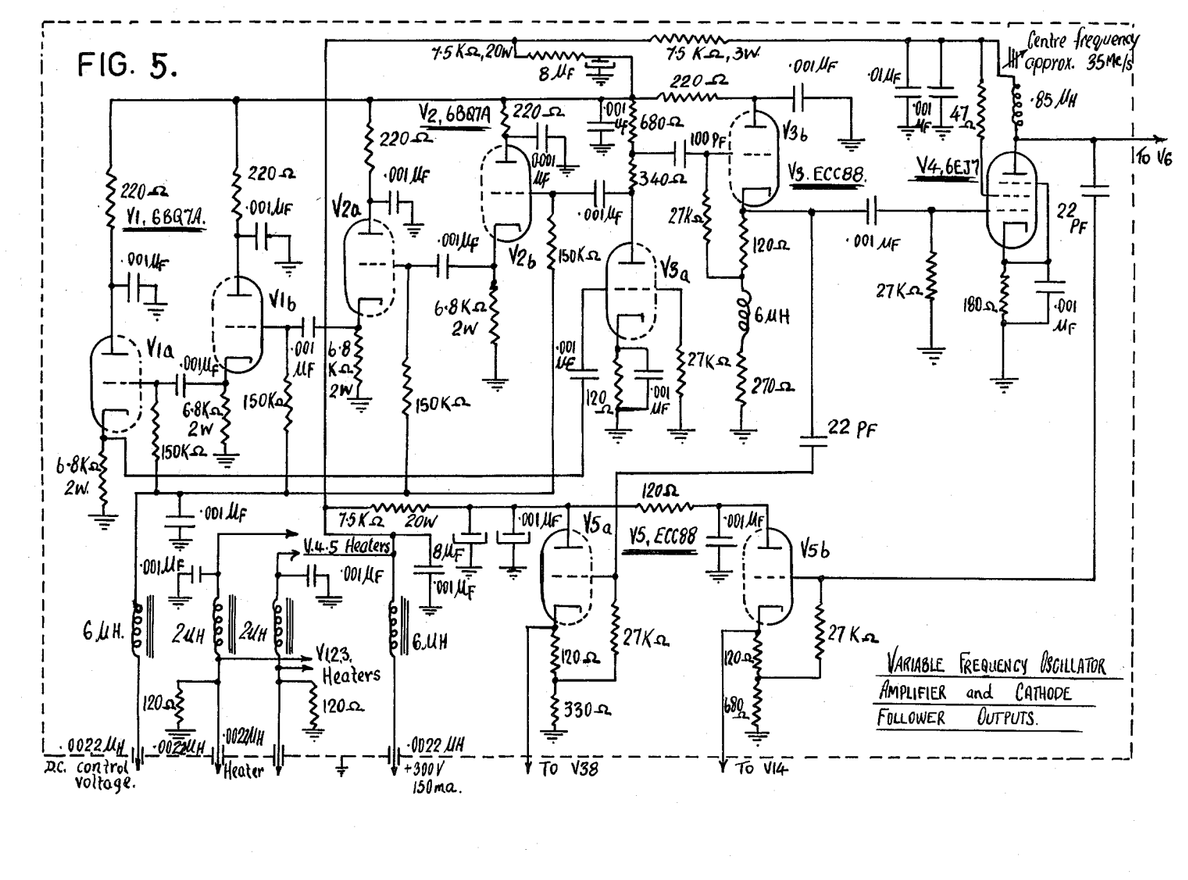
FIGURE 5 is a circuit diagram of the variable frequency oscillator of an ionoscope made in accordance with the present invention

The oscillator is a phase shift type similar to that described by Ames (1949) and Cormack (1951). However, the upper frequency limit has been extended by using high transconductance triodes, and both frequency limit and frequency-voltage linearity have been improved by careful attention to loading considerations. It consists of a unity gain triode amplifier V3A and four cathode followers V1A, V1B, V2A, and V2B arranged in a ring circuit. (See FIGURE 5.) Oscillations occur at a frequency where the circuit resistance and capacitive reactane of all four cathode follower stages give a phase shift of 180 degrees. The circuit resistance of each cathode follower is varied by changing applied bias voltage from the program unit. The variation of frequency with bias voltage over the range 28.1 to 48 mc./s. is linear and bias voltage changes of either logarithmic or linear variation with time can be applied permitting selection of either logarithmic or linear scan laws. Output voltage from the oscillator is taken from the triode amplifier V3A plate load, and to reduce the loading effect of the following circuitry the load resistor is tapped down approximately one third from the anode and coupled to a cathode follower V3B. A small choke is used in the cathode load of this valve to increase maximum permissible grid swing at high frequencies and prevent clipping. The voltage output from V3B varies from 1.8 v. R.M.S. to 1.2 v. R.M.S. over the range 28.1 to 48 mc./s. This is supplied to the frequency marker mixer V38 through a cathode follower buffer stage V5A. The transmitter and reeciver mixers require a higher voltage amplitude and this is provided by a tuned wide band amplifier V4, which has an output of 4.0 volts R.M.S. at 28.1 mc./s., 5 volts R.M.S. at 38 mc./s., and 3.8 volts R.M.S. at 40 mc./s. This stage is coupled to the transmitter mixer V6, the input impedance of which is low enough to provide the necessary shunt resistance to satisfy the wide band characteristics of the V4 amplifier. The receiver mixer V14, V15 is supplied from this V4 amplifier through a cathode follower buffer stage V5B which provides an output voltage of approximately 2.0 to 1.2 volts R.M.S. over the range 28.1 to 48 mc./s. All the stages described are enclosed in a shield box. The power supply leads have bypass filters to eliminate unwanted radio frequency pulses from the transmitter entering the circuitry. To reduce frequency modulation of the oscillator output due to A.C. heater cathode coupling, balanced filament windings are used.

(II) RECEIVER

This consists of a superheterodyne with an untuned aerial stage and mixer stage followed by sufficient intermediate frequency amplification to provide several volts of signal at the detector with high signal noise ratio. Double conversion is used to satisfy gain and bandwidth requirements with a minimum of amplifying tubes, and an unconventional balanced mixer circuit McAleer, 1960, with a high degree of balance permits reception of signals as low as 100 kc./s. with only a small deterioration in receiver sensitivity. Another feature of the receiver is the use throughout of variable-mu type amplifiers in the intermediate frequency section. This together with heavy biasing of the last stage minimises overloading effects due to strong signals.

The balanced aerial input is applied to a wide band radio frequency amplifier V13 through a wide band balance to unbalance transformer, or alternatively through this transformer and a band pass filter with cut-off frequencies of 1.5 mc./s. and 22 mc./s. to attenuate unwanted frequencies outside this band. The amplified signals from V13 are coupled to a balanced mixer comprising V14 and V15 which has a very high rejection characteristic to all but the desired beat frequency. This enables the frequency of the variable frequency oscillator to approach closely the intermediate frequency of 28 mc./s. without passing through the mixer and overloading the following amplifier V16. This is followed by a second mixer V17, the local oscillator of which is a harmonic crystal 26.1 mc./s. oscillator V22. Two additional amplifiers V18 and V19 provide intermediate frequency amplification at 1.9 mc./s., and it is here that most of the receiver gain and bandwidth characteristics are derived. It is necessary to render the receiver inoperative for a brief period coinciding with the commencement of the cathode ray oscillograph fast time base. This prevents strong C.W. signals from momentarily extinguishing the cathode ray tube and hence interfering with the appearance of frequency calibration marks. This is performed by applying a negative pulse from the transmitter trigger generator circuit V24 to the suppressor grid of V19 rendering this stage inoperative from before the start of the time base to the start of the transmitter pulse.

The output from the detector V20 is amplified by V21A and supplies a negative signal to a diode D.C. restorer and clipper at the input of the cathode ray tube modulator V36. The amplifier V21B provides audio amplification for a monitoring loud speaker. Small type NE2 neon regulators are used across V16 and V18 screen grids to help shorten receiver recovery time after large signal transients. The receiver has a 3 db bandwidth of 20 kc./s. and an overall sensitivity of one microvolt.

(III) FREQUENCY CALIBRATOR

The final ionosonde presentation or ionogram must be provided with calibration of both frequency and height.

Frequency calibration is provided by heterodyning the variable frequency oscillator output with harmonics of a one megacycle harmonic generator and using the resultant zero beats to generate short sharp pulses corresponding to each megacycle in the frequency scan. These pulses are then applied to intensifier circuits in such a way as to provide suitable marks on the visual display. In this equipment, contrary to usual practice, circuitry is arranged so that frequency calibration marks appear at the top and bottom of the record only, thus avoiding possible obliteration of ionogram detail (see FIGURES 6, 7 and 8). Another feature provides that the time occupied by a frequency calibration mark remains constant irrespective of the time occupied by a frequency scan. This ensures that calibration marks are always readily observable on the ionogram for any chosen scan period.

A 6BL8 triode pentode V37 is used as the crystal oscillator and harmonic generator. The high amplitude signal generated in the one megacycle crystal oscillator triode section is clipped on the grid of the pentode section, the anode circuit of which is a tuned wide band transformer with a centre frequency of approximately 50 mc./s. The output of V37 is rich in one megacycle harmonics, and 60 mc./s. band traps are included in the coupling circuits to the frequency calibrator mixer V38, and between the mixer and the variable frequency oscillator to prevent spurious calibration marks caused by higher order harmonics, beating with the second harmonic of the variable frequency oscillator.

The mixer V38 is a type 6BQ7A twin triode with the anodes connected in parallel and the variable frequency oscillator and harmonic generator are coupled one to each grid. Radio frequencies are filtered from the resultant audio beat frequency output which is fed through a 1000 pf. bypass capacitor from a shielded box containing the abovementioned circuitry. High tension and filament leads to these circuits also are filtered by similar bypass capacitors. This precaution prevents radio frequency pulses from the transmitter entering the oscillator and mixer and causing spurious calibration marks. The beat frequency output from V38 is further amplified by a type 6BX6 audio frequency amplifier (V39) and applied to a type 12AU7 tube V40 acting as triggered squaring circuit, through a variable attenuator, which sets the triggering level. High frequency bypassing is employed at this point to eliminate spurious triggering due to the transmitter pulse. The squared beat frequency output from V40 is differentiated, clipped, and used to trigger a long time constant monostable multivibrator comprising V41 and V42 for a period of 50 milliseconds. This ensures that the calibration mark covers two time base periods regardless of the position in time of the calibration trigger with respect to the time base synchronising trigger. The 50 millisecond positive pulse output from V42 is directly coupled to the screen grid of the pentode section of V43. This is a gated 10 kc./s. multivibrator, the output of which provides the actual calibration marks. To prevent the markers from occurring during the major portion of the time base period the multivibrator is again gated to render it inoperative by applying a negative square wave from V28 of the time base generator to the control grid of V43 pentode section. This negative time-base gate is distorted by capacitive loading to allow the multivibrator to operate for a short time at the start and end of the time base. It is this feature which provides frequency marks at the top and bottom of the ionogram only. The positive 10 kc./s. signal group is taken from the V43 triode anode through a variable attenuator, differentiated, clipped and coupled to the control grid of V36 pentode section. This is a two stage gated amplifier which is controlled by a positive time base gate from V30A. The output of this amplifier consists of a square wave on which is superimposed a small group of 10 kc./s. calibration pulses at the start and end of the square wave period. This is applied to the cathode ray tube grid normally biased so that the display is extinguished. This renders the trace visible during the forward stroke of each time base period and allows additional brightening over portions of the trace during the calibration marker interval. The 10 kc./s. marker pulses are also applied to the cathode ray tube deflection time base amplifier V48 (12AU7), giving a negative going stroke at each calibration point on the cathode ray tube trace. This stroke appears on the base of the resultant ionogram as a clear stroke emerging from the actual picture.

(IV) FIXED FREQUENCY OSCILLATOR

This oscillator operating at 28 mc./s. is pulse modulated by the transmitter modulating pulse to prevent continuous receiver paralysis. A pulsed Hartley oscillator (Gamertsfelder and Holdam, 1949) is used and since it operates over a linear region of the tube characteristics it is particularly free from frequency deviation effects due to stray power amplifier pulses in the grid circuits. The class C pulsed oscillator previously employed is particularly prone to this defect.

A type 12AU7 twin triode V9 (A and B) is used as the oscillator. The triode section V9B is normally conducting and acts as a clamping triode preventing oscillation. This is switched to a non-conducting state by a negative pulse taken from the anode of V26A. The oscillator output from V9A is coupled by a buffer amplifier V8 to the transmitter mixer V6. The oscillator and buffer amplifier valves and associated circuitry are housed in a shielded box. High tension and filament leads are coupled through bypass filters to prevent entry of R.F. pulses from the transmitter.

(V) TRANSMITTER

This consists essentially of a mixer to obtain the sweep frequency from the variable frequency oscillator output and the pulsed output of the fixed frequency oscillator, followed by sufficient amplification to derive satisfactory power output in transmitter aerial circuits. Most ionosonde transmitters of comparable power output use wide band resistance capacitance coupling between amplifier stages. Considerable economy is affected in this design by the use of wide band transformers in the grid and plate circuits of the final power amplifiers. This enables smaller and cheaper tubes to be used, and reduces number of amplifying stages, with consequent economies in power supply demand.

The transmitter section comprises the mixer V6 and three stages of broad band amplification V7, V10, V11 and V12. The mixer is a twin triode V6 arranged in an unconventional balanced circuit (McAleer, 1960). One grid is connected to the variable frequency oscillator amplifier V4 which supplies 3.8 to 5 volts R.M.S. over the 28.1 mc./s. to 48 mc./s. frequency sweep. The other grid is provided with approximately 3.8 volts R.M.S. at 28 mc./s from the fixed frequency buffer amplifier V8.

The common anodes of each section are connected through a four terminal coupling network to V7. Because of the self-balancing nature of the mixer circuit the output is almost free of variable frequency oscillator and fixed frequency oscillator signals, and consists mainly of the required difference frequency varying from three to four volts R.M.S. over the range 0.1 to 20 mc./s. Voltage measurements in these initial stages of the transmitter may be facilitated by biassing V9B with a negative potential so that the fixed frequency oscillator operates continuously. The output from V6 is further amplified by pulsed amplifier V7. This is normally inoperative due to a negative bias on the screen grid of 125 volts. It is pulsed into an operative condition by application of a 675 v. positive pulse from the transmitter modulator V27, and develops its operating bias of 5 volts across the cathode resistor during the pulse interval. The anode of V7 is connected through a four terminal coupling network to V10 and is supplied from a 575 volt high tension supply with decoupling provision for radio frequency and D.C. pulses.

V10 is pulsed amplifier, pulsed in the same manner and under the same voltage conditions as V7. The operating bias of 30 volts is developed across the cathode resistor during the pulse interval.

The anode is supplied from an 800 volt high tension supply through a small peaking inductance and the primary winding of a wide band transformer TXII decoupled for radio frequency and D.C. pulses. The secondary winding of the wide band transformer provides out of phase signals to drive the grids of the push pull final amplifiers V11 and V12. To obtain maximum coupling with the least amount of unbalance across secondary windings, all the windings are identical and each is wound over the top of the previous one. Each winding consists of eight turns of 10 x 30 g. B. & S. PVC covered wire insulated from each other by .005 inch polythene sheet on an A2 ferroxcube core section in the form of two stacked square section TV line output transformer cores, the core section being insulated from ground. Each secondary winding is shunted with a one thousand ohm resistor which in parallel with the grid circuit impedance of the push pull amplifier effectively shunts the anode circuit of V10 with approximately 500 ohms. This low shunt impedance is essential to provide the wide band characteristics of the amplifier. Peak voltage developed at each grid of the push pull amplifier ranges from 175 volts to 90 volts over the 0.1 to 20 mc./s. frequency range.

The push pull power amplifier stage comprising V11 and V12 operates in the class B region, appropriate grid bias being developed during the pulse interval partially across each cathode resistor and partially across a common 47,000 ohm resistor bypassed for radio frequency and D.C. pulses. The anodes of V11 and V12 are connected through peaking coils to the primary winding of a wide band transformer. The centre tape of this winding is connected to 2700 volts high tension and bypassed for radio frequency and D.C. pulses. The secondary winding of the transformer is connected to the transmitter aerial. Both windings are wound on a core insulated from ground. The primary winding has sixteen turns centre tapped and the secondary winding consists of fourteen turns wound symmetrically over the primary winding, with a double layer of .005" sheet Polythene providing interwinding insulation. Each winding is wound from Telecon PT9M coaxial cable with the outer insulation and braid removed. The peak pulse power developed in a 600 ohm load resistor across the transformer secondary is within 5.5 kw.±2 db over the frequency range 0.1 to 20 mc./s.

All pulsed amplifier stages are keyed by the same transmitter modulator V27. Small serial resistors and bypass capacitors adequately isolate the pulsed screen circuits from each other and provide necessary bypass of radio frequency without serious pulse distortion. All the heater circuitry in the complete amplifier is filtered to prevent radio frequency feedback.

Transmitter aerial must radiate efficiently in a vertical direction over the frequency range. A delta type aerial similar to that described by H. N. Cones et al. (1950) is recommended.

(VI) PULSE MODULATOR

Pulse operation of some of the amplifiers in the transmitter is necessary so that normal power ratings may be increased with consequent increases in effective mutual conductances. This affects considerable economy in power amplification stages. Some form of pulser is therefore necessary to provide the switching operation. The particular type of pulser circuit used in this equipment known as a bootstrap pulser (Glasoe, 1948) presents a low impedance source to the pulsed screen grids of the amplifier stages. This permits loading by complex impedances in pulsed circuits and also enables screen grids to be adequately bypassed for R.F. without affecting pulse shape. All pulsed stages are supplied by one pulse modulator. Previous equipments used several modulators for this purpose.

The triggering pulse for the modulator is derived from a train of short height marker pulses taken from the height marker divider V35. This train is differentiated and the sharp leading edge used to trigger the pulse trigger generator V24, a monostable multivibrator with an off period occupying almost one main frequency cycle. A positive trigger pulse derived by differentiating and clipping the output from the cathode of V24 is used to trigger V25, the transmitter pulse generator, which provides a positive pulse of either 50 or 100 microseconds. This method of deriving the modulator pulse ensures that the transmitter pulse is always locked to the first height calibration marker, and considerably improves height measurement accuracy. The output from V25 is inverted by triode inverter V26A and the negative output used to pulse modulate the fixed frequency oscillator V9. The output from V25 is also coupled to a cathode follower V26B which drives the pulse transformer TPI. This transformer and associated circuitry of V27 form a pulse stage which produces the transmitter amplifiers modulation pulse across the cathode load of V27, which is a very low impedance source. All the transmitter amplifier stages are pulsed from this source through small values of isolating resistors.

(VII) DISPLAY, TIME BASE AND HEIGHT CALIBRATION UNIT

The purpose of this unit is to generate the time base correctly calibrated for height by calibration markers and to provide the final cathode ray tube display which is photographed to produce the ionogram. Many of the techniques used are unique in this type of recorder. Contrary to the usual practice of generating several square wave forms to operate time base generator, height calibrator, and control associated display circuits, the time base generator itself is used to generate a single square wave control for all functions. This considerably simplifies required circuitry. Furthermore, direct coupling is almost entirely used throughout the unit instead of the usual resistance capacity coupling ensuring less possibility of component breakdown.

Mains frequency synchronisation of time base is employed this being taken from the variable frequency oscillator balanced heater supply. This is coupled to a squaring circuit V23 through a continuously variable phase shift network and relay 2 in the program unit which is operative during the sweep period. A positive square wave from V23 is differentiated, clipped and used as a positive pulse to trigger the fast time base generator.

This fast time base generator consists of a monostable multivibrator using the pentode-triode 6BL8, V28, a bootstrap linearizing triode, the first section of a 12AU7, V29A, and a catching diode using the second section of the 12AW7, V29B. A linear positive saw tooth voltage developed across the cathode load of V29A has its amplitude kept constant, over the variable sweep rate of the generator, by the action of the diode V29A which switches the multivibrator to its stable position at a certain sweep amplitude.

The combination of coarse and fine sweep rate controls provides a continuously variable range scale from 100 to 1000 km. on the cathode ray tube screen.

The positive saw tooth voltage is applied to a potentiometer, the time base D.C. level control, the other side of which is returned to the negative voltage supply. The control is set so that the output to the fast time base amplifier V48 (see programme unit) is at ground potential with the multivibrator in its stable state.

The square wave of the time base generator is taken from a tapping on the screen load resistor of the pentode section of V28, and coupled through an isolating resistor to a cathode follower using the first section of a double triode 12AU7, V30A. Two outputs are taken from potentiometers in the cathode circuit. The first supplies the height calibrator unit and the second is directly coupled to the screen grid of the pentode section of a 6BL8, V36A. Since the potentiometers are returned to a negative supply the amplifier is inoperative in the absence of a square wave signal. The square wave generates a negative step voltage across the anode load of V36A, which is fed through a capacitor coupling to the grid of the triode section V36B. The positive step voltage developed across the anode load resistor of this triode is capacitively coupled to the grid of the cathode ray tube V49 and clamped by diode V50. The positive voltage step waveform causes brightening of the cathode ray tube trace during the time base period. Negative signals from the receiver and height calibrator unit are mixed in the control grid of V36A and appear negative going on the positive step voltage output of V36B, causing the cathode ray tube trace to be correspondingly blacked out. Positive frequency calibrator markers generation which are described in section 4 III are also mixed in the grid circuit of V36A. These cause brightening of the C.R.T. trace at the beginning and end of the fast time base period, and also of the downward deflected frequency mark. Signal mixing in the grid circuit of V36A is accomplished by directly coupled germanium diodes and resistive networks.

The height calibrator oscillator uses a 12AU7 double triode V31 and a 6BL8 pentode triode V32 in a gated twin-T type of circuit. All the components used in the oscillator are of the high stability type. Measurements over a period of months showed an oscillator stability of one part in 3,000 over a twelve hour period, which is considered sufficient for the height accuracies demanded.

The pentode V32A is gated by application of a positive square wave from the cathode follower triode V32B, which is coupled to the potentiometer output of V30A. The cathode follower provides isolation of the height marker oscillator from the cathode ray tube modulator circuits. When operative V32A forms portion of a twin-T oscillator circuit. Two feedback paths are provided, positive feedback from the plate load of V32A through the common terminal of the twin-T network, the cathode follower V31A, and the inverting triode V31B, and negative feedback via the same path but taken from the cathode of V32. The combination of positive and negative feedback helps to stabilize frequency and amplitude of oscillation. Additional improvement in frequency stability is provided by the cathode follower V31A which isolates the twin-T network from the inverting triode V31B. A fine adjustment for the frequency is provided in the twin-T network.

The output of the oscillator consisting of oscillations at a frequency of 15 mc./s. occurring during the time base interval only is taken from the cathode of V32A. This is directly coupled to a cathode follower using half of a double triode 12AU7, V30B, which provides isolation from the squaring circuit using a double triode 12AU7, V33. The cathode of V30B also serves as a test point for frequency measurements.

The squared wave taken from the second anode of V33 is differentiated and clipped to provide very short negative pulses at 15 kc./s. These are switched, if 10 km. height marks are required, to a diode mixing circuit which is directly coupled through a resistive network to the control grid of the pentode section of V36, the cathode ray tube modulator. The 15 kc./s. pulses are also coupled through half of a 6A15, V34, diode to trigger a divider circuit using a double triode 12AU7, V35, which divides the 15 kc./s. pulses by five, giving 50 km. height marks. The square wave output is taken from the first anode of V35, is differentiated and clipped to provide very short pulses at 3 kc./s. These pulses are coupled to the diode mixing circuit and fed through a resistance network to the control grid of the C.R.T. modulator valve V36A. The nature of the pulses is such that 10 km. markers appear, if required, on the C.R.T. trace much narrower than the 50 km. markers for easy identification.

A small one inch cathode ray tube is provided for monitoring purposes. This gives a class A display and facilitates adjustment of the fixed frequency oscillator.

(VIII) PROGRAM UNIT

This unit determines the particular program on which the equipment operates. It is entirely different from those usually employed in such equipment, in that functions are more numerous than usual, are generated electronically, and as previously indicated are not controlled by cams driven by electric motors.

The unit performs the following functions:

It generates the variable frequency oscillator bias voltage in three forms, (i) Logarithmic change with time,
(ii) Linear change with time,
(iii) Manual control.

It generates the horizontal deflection voltage linear against time for the cathode ray tube. This is called the slow time base generator.

It amplifies the vertical deflection voltage for the cathode ray tube. This is called the fast time base amplifier.

It controls
(i) The time duration of one sweep of the slow time base,
(ii) The period between sweeps,
(iii) The camera triggering impulse.

It controls the starting voltage and range of sweep applied to the variable frequency oscillator.

It indicates, on a voltmeter, the transmitter frequency, as determined by the bias voltage to the variable frequency oscillator. This enables the operator to adjust the controls of the fixed frequency oscillator and the transmitter to give the required sweep.

The unit may be divided into the following sections:

*(a) The slow time base generator-linear operation*

This generates a push-pull voltage to give a horizontal deflection linear with time on the cathode ray tube.

It consists of a cathode coupled push-pull twin triode amplifier using a 12AU7, V45. The twin triode has a voltage applied through a charging circuit to the grid of its first section. The charging circiut consists of an 8 μf. capacitor C1 and five megohm resistors R1 in series. The resistors are arranged so that four of them can be switched incrementally in or out of the circuit, forming the coarse variable sweep time control, whereas the fifth resistor is a variable one and is the fine sweep time control.

The charging voltage is taken from a linearizing potentiometer, across the anode load of the first section of V45, which is adjusted to provide unity gain at the charging voltage point, and thus to provide a constant voltage across the resistance arm of the charging circuit. As the capacitor C1 charges positively, the potential of the first anode falls whereas that of the second rises. The voltages applied to the deflection plates of the cathode ray tube cause the spot to move from left to right.

The grid of the second section of the twin triode is connected to a small variable voltage source to enable control of the starting position of the trace on the left hand side of the cathode ray tube screen, when the grid of the first section is at ground potential.

When the C.R.T. trace reaches the desired position on the right hand side of the screen, the cathode voltage of V45 approaches the pre-set cathode voltage of V46 a 6BX6 valve. The cathode of V45 is connected to the grid of V46, and thus V46 starts to conduct, operating a relay connected to the anode, and causing the contacts of the relay to close. A second relay then operates causing contacts A, B, C and D to close and E and F to open. When contacts A close, the control grids of the twin-triode 12AU7, V44, are short circuited to ground, causing V44 to conduct and discharge the capacitor C1, and return to its static position and the trace on the C.R.T. to the left hand side of the screen. As it is required to extend the off period of the slow time base for a desired time V46 has another valve 12AU7, V47, in parallel with it.

During the slow time base sweep V47 is cut off by a fixed bias on its cathode. When contacts B are closed at the end of the sweep, a positive voltage from the charged capacitor is applied to the grid, and causes current to flow through V47 and thus through the first relay. Capacitor C2 is charged during the sweep interval, and disconnected by contacts E from its voltage source at the end of the sweep period. It then starts to discharge through the second relay, a variable resistor which allows control of the off time. Longer periods between sweeps can be obtained from an external source which provides a longer time constant of the decay of the positive voltage applied to the grid of V47.

Second relay contacts F, disconnects the 50 cycle synchronising signal to V23 during the period between sweeps, and renders the pulse circuitry of the recorder inoperative. Thus no C.R.T. trace or transmitter pulse occurs between sweeps. The second relay contacts C provide an impulse for moving the camera on one frame at the end of each sweep.

Figure 6:
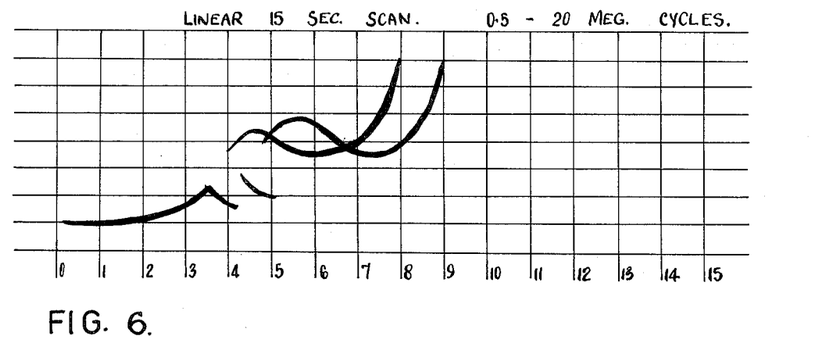
FIGURE 6 is a graphical record of a linear 15 second scan of the ionoscope illustrated in the FIGURES 1 to 4, between 0.5 and 20 megacycles.

The variable frequency oscillator linear bias voltage is taken from the second anode of V45 through two potentiometers and switch S1. The anode potential arises from a positive value to a more positive value during the sweep. The first potentiometer is connected across the anode load resistor, and thus its major effect is to tap off a certain fraction of the total voltage charge. It is thus called the frequency sweep range control. The second potentiometer is put across the output of the first and the negative voltage supply. Thus its major effect is to control the starting potential and it is called the frequency sweep start position control. The voltage sweep is applied, through S1 to the variable frequency oscillator and the indicating meter M1. Zero on the meter scale indicates that the variable frequency oscillator is at 28 mc./s. (with a bias voltage of about 25 volts). A potentiometer allows the operator to set the meter accurately on zero with the 28 mc./s. frequency marker on the C.R.T. trace. The calibration of the meter reading against recorder frequency is shown in FIGURE 6, and allows the operator to arrange the sweep over any desired frequency range by setting the two frequency sweep controls to give the required range on the meter.

(b) *Logarithmic sweep law*

This is generated by applying a chosen voltage from the sweep manual control to charge an 8 µf. capacitor C3. This capacitor is connected to the range control through the selector switch S1 and the second relay contacts D. Between sweeps, C3 is charged to the chosen potential indicated on the meter. When the sweep starts, the second relay opens and C3 is disconnected from its supply and discharges through the meter and a resistance in series towards the zero reading on the meter which is the 28 mc./s. variable frequency oscillator bias setting. The upper frequency limit is determined by the charging voltage set by the V.F.O. log range set, and the lower frequency limit by the sweep time setting. The range covered may be observed on the meter. The logarithmic frequency scan is opposite in sense to the linear scan and always occurs from high frequencies to low frequencies.

The discharge of C3 through the resistance towards the bias voltage to give the frequency of 28 mc./s. gives a true logarithmic sweep law because (i) The variable frequency oscillator frequency varies linearly with bias voltage,
(ii) The horizontal sweep on the C.R.T. varies linearly with time, (iii) The fixed frequency oscillator frequency is 28 mc./s.

(c) *Manual control*

Employing a manual control setting, the bias voltage to the variable frequency oscillator is obtained through the potentiometer marked V.F.O. log sweep and manual set control. This provides a voltage variable between 25 volts and 100 volts.

(d) *The fast time base*

The fast time base amplifier consists of a 12AU7, V48, twin triode, cathode coupled, push-pull amplifier which provides the vertical deflection voltage for the cathode ray tube V49. An amplitude control is connected to the grid of the first section.

This control enables the length of the linear fast time base to be set on the cathode ray tube screen. The grid of the second section is connected to a small variable voltage source to provide vertical positioning of the trace. Attenuated frequency markers are also applied to this grid to cause an opposite deflection to that of the C.R.T. trace during a frequency marker interval.

(e) *Single shot ionograms*

To enable manual single slot displays on the cathode ray tube, a push-button switch is provided which shorts the grids of V47 to ground. This automatically starts the sweep period. Should a separate monitor cathode ray tube be employed with the basic recorder, a relay rendering the camera and recording cathode ray tube inoperative for the time of the shot sweep can be added to the programme unit.

(IX) POWER UNIT 1

This unit provides high tension voltages for the transmitter amplifier, the pulse modulator and the cathode ray tube displays.

Figure 4:
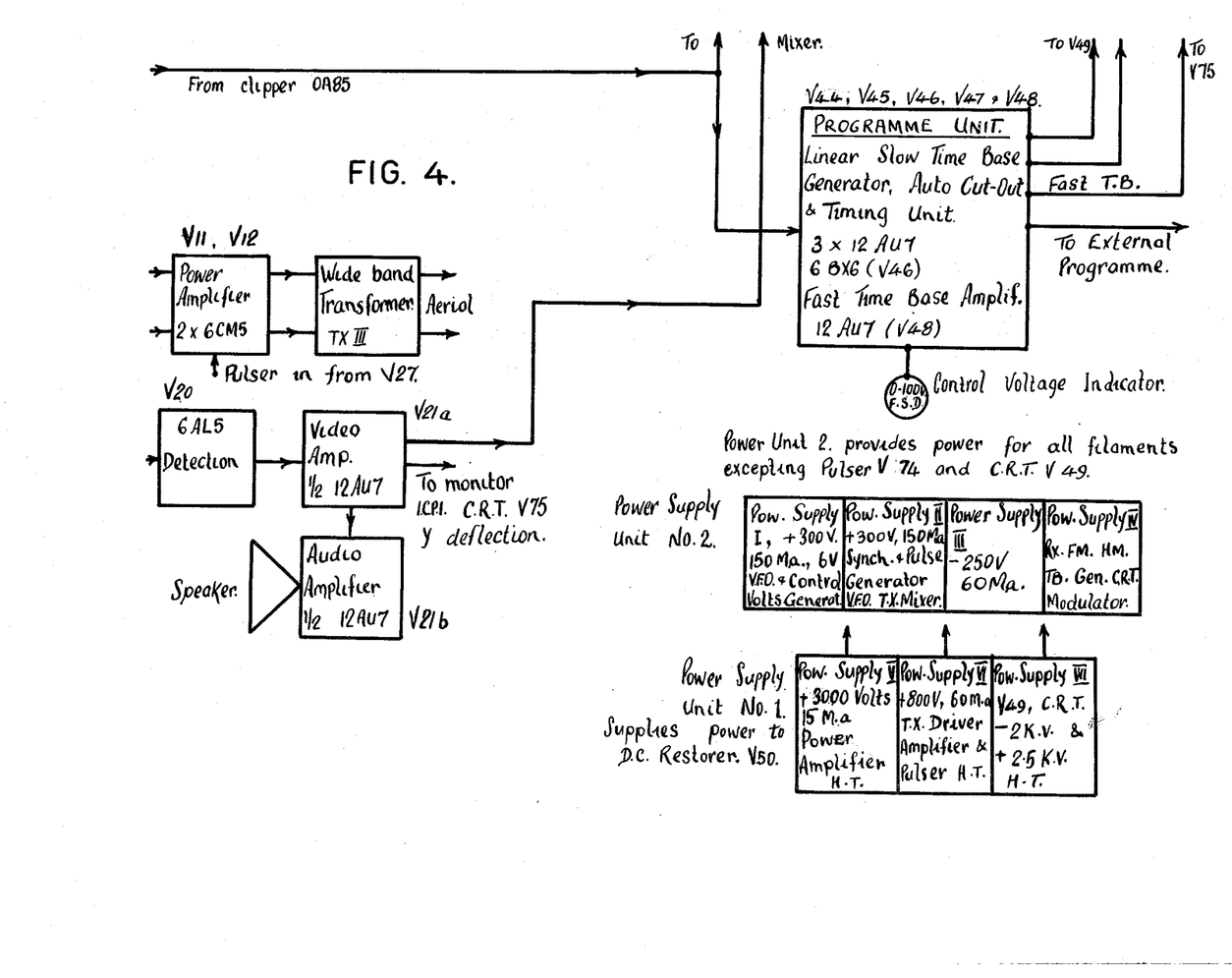

Power supply V (see FIGURE 4) develops 2700 volts at a current ration of 15 milli-amps, and is fully protected by an overload device using two relays. Should any momentary flash ever occur in the associate circuitry of this supply, a relay will close and first contacts will open circuit the mains supply to the transformer T6 primary. Second relay contacts close and apply a positive potential of 200 v. derived from power supply VI to a charging circuit at the grid of V53. Since the mains supply to the transmitter T6 has been interrupted, current will cease to flow in power supply V and the relay will return to its normal state. However, should a continuous breakdown occur, the process will repeat itself until a condenser in the charging circuit at the grid of V53 is charged to a potential which exceeds that of the cathode bias on the valve. When this occurs V53 will draw current, closing relay 4 to short circuit contacts A and hence locking the grid of V53 to a positive potential.

A relay rendering power supply V inoperative and this condition will persist unless the operative relays are reset by SW1. A test switch makes provision for testing the overload circuitry of V53.

Figure 2:
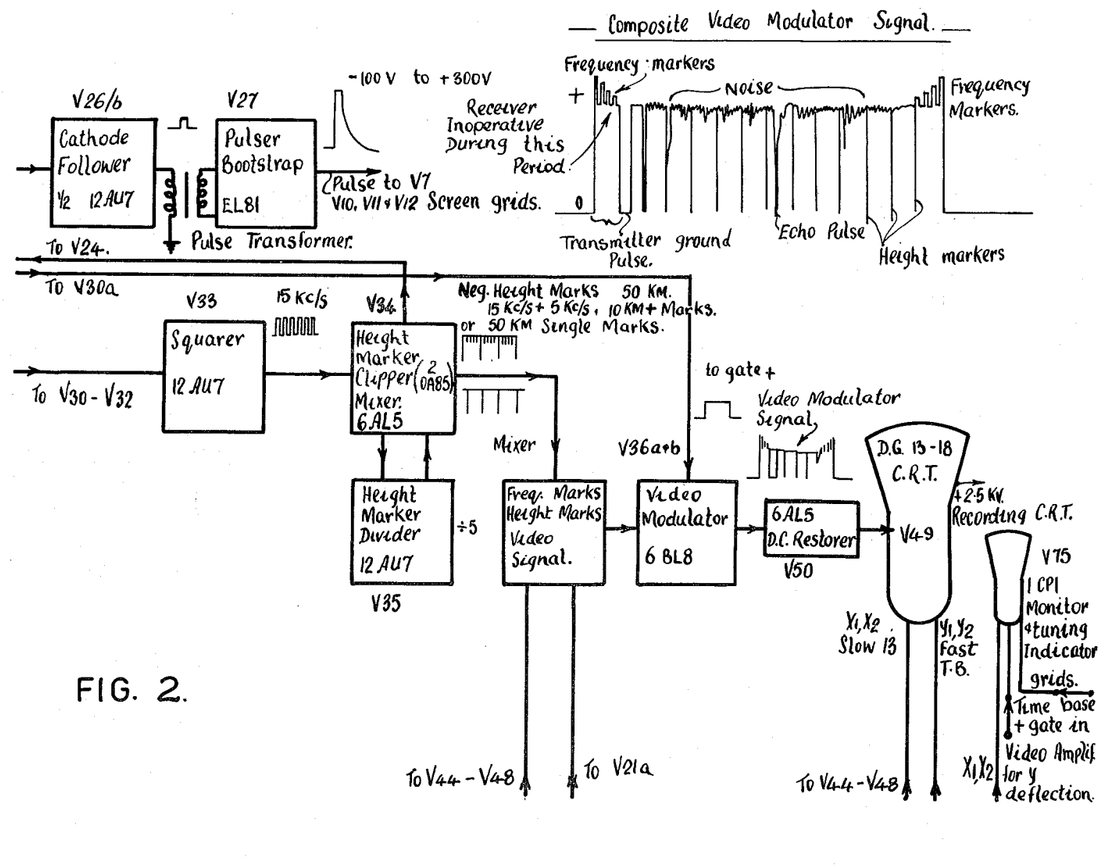
Figure 3:
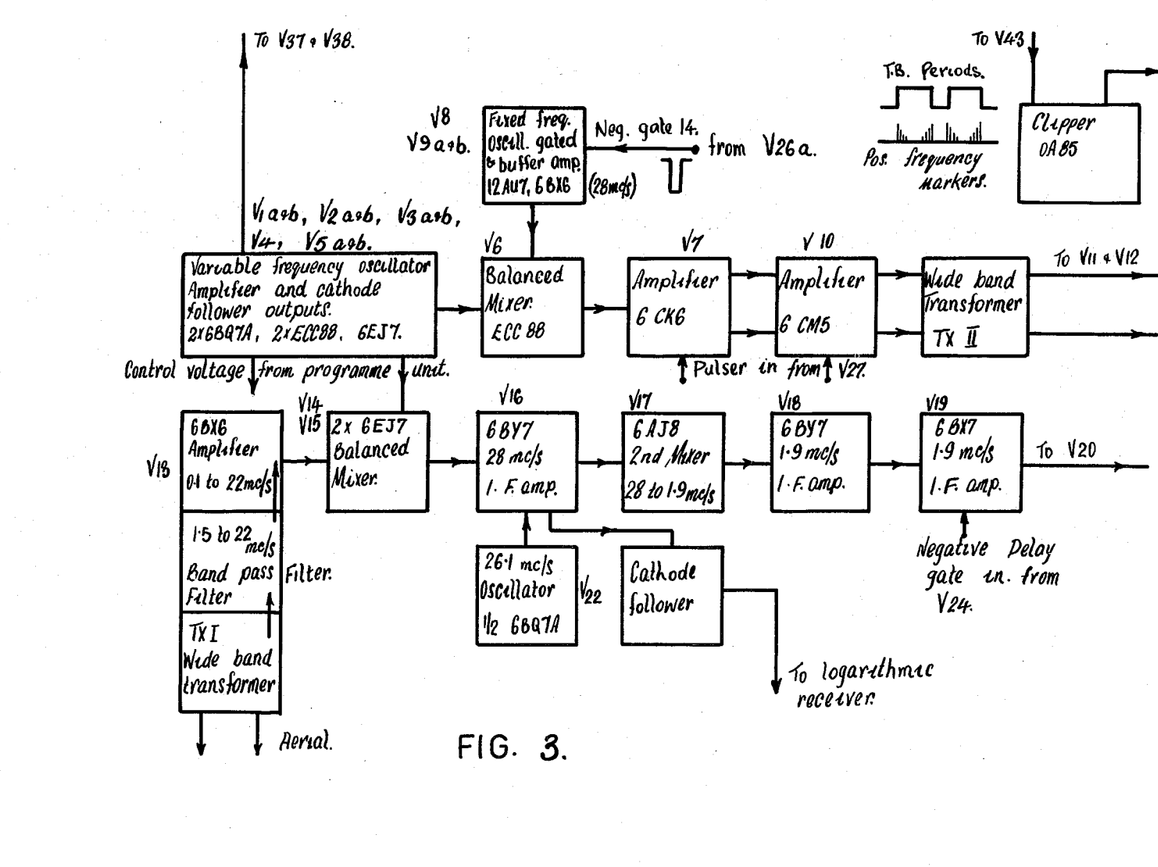

Power supply VI provides a positive potential of 800 volts at 30 to 50 milliamps. This supplies the transmitter amplifier V10 and a voltage divider which provides 550 volts for the transmitter amplifier V7 and the pulse modulator V27 (see FIGURES 2 and 3). Tthe power supply also provides 200 v. at 10 milliamps for the overload charging circuit associated with V53, and heater voltages for V27.

Power supply VII provides potentials for the cathode ray tube indicators, a positive potential of 2500 volts and a negative potential of 2000 volts both at a current rating of five milliamps. It also provides heater voltages for these two tubes. Each power supply has a separate switch and its individual fuse protection. An indicating voltmeter and switch is provided to monitor all high tension voltages.

(X) POWER UNIT 2

This unit provides electronically regulated positive and negative fully protected high tension supplies, which can be listed as follows:

(i) A power supply of 300 volts high tension at 1500 milliamps and the necessary heater voltages to supply the variable frequency oscillator.

(ii) A power supply of 300 volts high tension at 150 milliamps to provide the pulser, transmitter mixer, fixed frequency oscillator, fast time base amplifier and portion of the program unit. This also provides heater voltage for the transmitter power amplifier.

(iii) A negative power supply of 250 volts at 60 milliamps to provide all sections of the recorder. It has an interlock safety relay which renders the pulser and transmitter high tension supplies inoperative until the negative potential has reached a predetermined value, thus protecting these stages. This supply also provides heater voltages for the transmitter mixer, transmitter amplifier, program unit, sections of the electronic regulators of the power supplies I and IV and a small cathode ray tube tuning indicator.

(iv) A power supply of 250 volts high tension at 200 milliamps to provide the receiver, frequency marker, time base generator, height calibrator and cathode ray tube modulator. This also provides the necessary heater voltages for these units.

Figure 1:
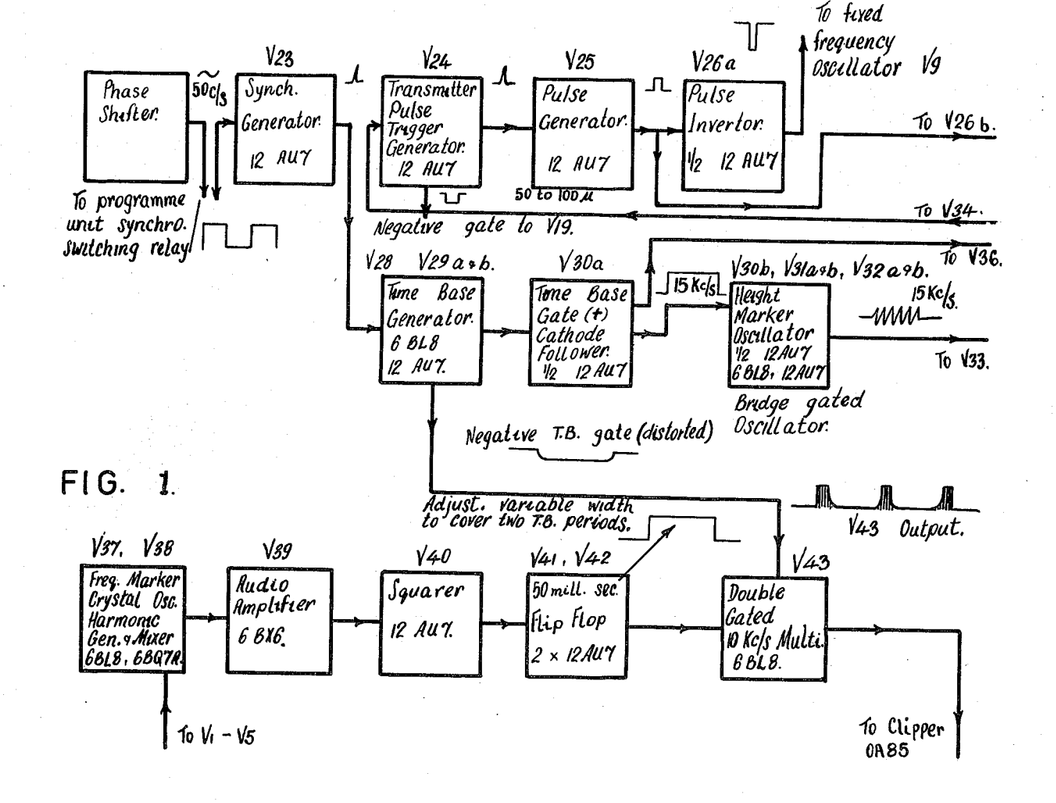
FIGURES 1 to 4 jointly display a block diagram illustrating the components of an ionoscope made in accordance with the invention and their interrelationship
Figure 7:
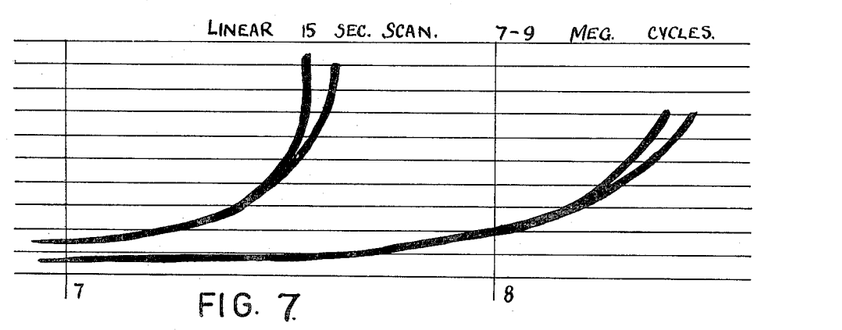
FIGURE 7 is a graphical record of a linear 15 second scan of the ionoscope illustrated in FIGURES 1 to 4, between 7 and 9 megacycles
Figure 8:
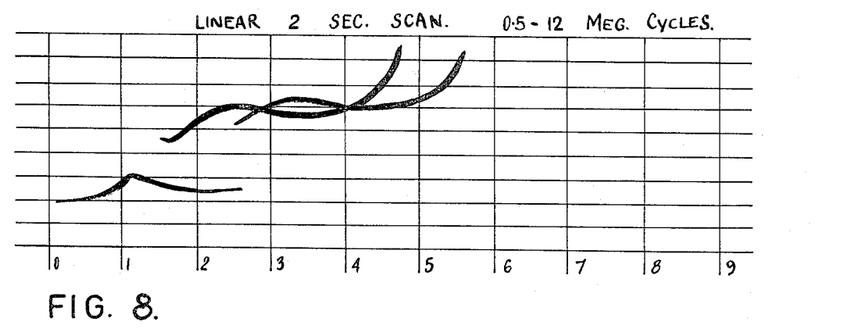
FIGURE 8 is a graphical record of a linear 2 second scan of the ionoscope illustrated in FIGURES 1 to 4, between 0.5 and 12 megacycles.

Typical ionograms produced by the recorder are shown in FIGURES 6, 7 and 8. FIGURES 6 and 7 are both examples of 12 second linear sweeps. In FIGURE 6 the frequency range covered is from 0.5 to 20 mc./s. while in FIGURE 7 the frequency range is from 7 to 9 mc./s. approximately. In this figure note the splitting on both O and K components which would be barely observable on a normal record covering the complete frequency range. FIGURE 8 shows a very fast linear sweep of 2 seconds over the frequency range 0.5 to 12 mc./s. It will be noticed that the sweep is so rapid that individual strokes of the time base are obvious, yet in spite of this the amount of information available does not differ materially from that in FIGURES 1 and 2. The examples serve to illustrate the great versatility of the equipment both in scan period and frequency range.

The specifications of the equipment in accordance with the invention are tabulated as follows.

(a) Transmitter—
  Peak pulse power output: Peak pulse power output into 600 ohm load not less than 5.5 k.w. and constant within ±db over the full frequency range.
  Pulse repetition frequency: Mains frequency (nominally 50 c./s.).
  Pulse duration: 50 microseconds or 100 microseconds.
  Range of frequency scan: Maximum 0.1 to 20 mc./s. with higher minimum and lower maximum available separately by adjustment of controls; settings indicated on front panel.
  Law of scan: Linear, logarithmic or manual.
  Duration of scan: Linear—2 seconds to 20 seconds. Adjustable in 5 second steps with continuous adjustment over the range of each step setting indicated on front panel.
    Logarithmic—Similar to linear but short duration scans are limited by choice of range of frequency scan.
    Manual—2 seconds to infinity.
  Scan repetition frequency: Selection of scanning repetition frequency by operation of a control to give almost continuous adjustment to a one minute interval. Intervals longer than this can be provided by an external program unit. Provision of one scan operation when triggered manually.

(b) Receiver—
  Type: Double superheterodyne synchronously tuned to transmitter.
  1st I.F. frequency: 28 mc./s.
  2nd I.F. frequency: 1.9 mc./s.
  Overall bandwidth: 20 kc./s.
  Sensitivity: 1 microvolt. (This reading is for recognition of 1 kc./s. 100% modulated envelope above noise at detector output.)

(c): Display—
  Recorded: Panoramic short-persistence 5 inch cathode ray tube photographed on 35 mm. film, either one frame per scan or on uniformly moving film.
  Height calibration marks: Shown on recorder display as fine dark horizontal lines at 10 km. intervals and broader dark lines at 50 km. intervals. A choice of either set of marks is possible. Transmitter pulse is always coincident with the first calibration mark. Height range continuously variable from 200 km. to 1000 km.
  Frequency calibration marks: Shown on recorded display as short bright vertical index marks at top and bottom edges of the display, spaced at 1 mc./s. intervals.

(d) Mains supply—Single phase 240 volts 50 cycle power consumption 675 watts.

(e) Dimensions—22 inches square; 34 inches high (without camera and camera box).

(f) Weight—235 pounds.

References made to authors of publications in the foregoing text are amplified as follows:

Ames, Millard E. (1949), Electronics, May 1949, 96.
Cones, H. N., Cottonyl, H. V., and Watts, J. M. (1950), Journal of Research of N.B.S., 44, 475.
Cormack, A. (1951), Wireless Engineer, 28, 266.
Gamertsfelder, G. R., and Holdam, J. V. (1949), M.I.T., Radiation Laboratory Series 19, 143–145.
Glasoe, G. N. (1948), M.I.T. Radiation Laboratory Series 5, 120.
Heisler, L. H., and Wilson, L. D. (1961), Journal of Research of N.B.S. D Radio Propagation 61D, 629.
McAleer, Harold T. (1960), Electronic Industries 19, N. 10, 76.

What we claim is:

1. A multifrequency pulse-echo apparatus for ionospheric investigation comprising a receiving channel including a receiving antenna for ionospheric signals, a first mixer having a pair of input circuits, one input circuit of said first mixer being coupled to said receiving antenna, and a superheterodyne receiver connected to the output of said first mixer, said receiver having an untuned radio frequency input stage; a transmitter including a pulsed oscillator for generating radio frequency pulses at a constant frequency, a second mixer having a pair of input circuits, one input circuit of said second mixer being connected to said pulsed oscillator, an untuned radio frequency amplifier connected to the output of said second mixer, and a transmitting antenna for radiating exploratory pulses connected to the output of said untuned amplifier; a common oscillator connected to the other input circuit of said first mixer and said second mixer, said common oscillator being of variable frequency and including electronic means for automatically sweeping the frequency of said common oscillator within a desired range; means to generate a sweep base voltage electronically and coupled to said common oscillator for providing sweep control voltages of said common oscillator; means for providing a sweep voltage wave form of the correct shape and coupled to said sweep base voltage generator for varying said generator according to a desired law of variation; a cathode ray oscilloscope, means to control the horizontal deflection of the cathode ray beam of said oscilloscope with a time base voltage and coupled to said oscilloscope, this voltage being the same as the above said sweep voltage waveform, means to indicate the generation of a time base voltage at the instant of each pulse transmission coupled between said sweep control voltage generator and said transmitter, means to control the vertical deflection of the said cathode ray beam coupled between said cathode ray oscilloscope and the output of said time base voltage generating means, and means to control the intensity of said beam coupled between said cathode ray oscilloscope and the output of said superheterodyne receiver, whereby a pattern of ionosphere height as a function of transmitted frequency is exhibited on said oscilloscope.

2. A multifrequency pulse-echo apparatus for ionospheric investigation comprising a receiving channel including a receiving antenna for ionospheric signals, a first mixer having a pair of input circuits, one input circuit of said first mixer being coupled to said receiving antenna, and a superheterodyne receiver connected to the output of said first mixer for detecting the difference frequency in the output of said first mixer, said receiver having an untuned radio frequency input stage, a transmitting channel including a pulsed oscillator for generating radio frequency pulses at a constant frequency, a second mixer having a pair of input circuits, one input circuit of said mixer being connected to said pulsed oscillator, an untuned radio frequency amplifier connected to the output of said second mixer for amplifying the difference frequency in the output of said second mixer, and a transmitting antenna for radiating exploratory pulses connected to the output of said untuned amplifier; a common oscillator connected to the other input circuit of said first mixer and said second mixer, said common oscillator being of variable frequency and basically comprising a resistance capacitance, ring type oscillator having a triode amplifier and four cathode followers for providing the necessary phase shift, means coupled to said common oscillator for applying a voltage for controlling variations of the mutual conductance of the cathode followers for automatically sweeping the frequency of said common oscillator within a desired range; a cathode ray oscilloscope including vertical and horizontal deflection means and cathode ray beam intensity control means; means for generating a time base voltage at the instant of pulse transmission, means coupled between said voltage applying means and said vertical deflection means for applying said time base voltage to said vertical deflection means; means coupled to said common oscillator for generating a sweep voltage in synchronism with the frequency sweep of said common oscillator; means coupled between said sweep voltage generator means and said horizontal deflection means to apply said sweep voltage to said horizontal deflection means; and means coupled between said receiver and said intensity control means for applying the output of said receiver to said intensity control means, whereby a pattern of ionosphere height as a function of transmitted frequency is exhibited on said oscilloscope.

References Cited by the Examiner

UNITED STATES PATENTS

| 2,522,367 | 9/50 | Guanella | 343—17.2 |
| 2,525,328 | 10/50 | Wolff | 343—17.2 |
| 2,557,156 | 6/51 | Sulzer | 343—13 |
| 2,815,505 | 12/57 | Rodgers | 343—5 |
| 2,941,200 | 6/60 | De Lange et al. | 343—17.2 |

FOREIGN PATENTS 668,284   8/63   Canada.

CHESTER L. JUSTUS, *Primary Examiner.*